US009337664B2

(12) United States Patent
Von Novak et al.

(10) Patent No.: US 9,337,664 B2
(45) Date of Patent: May 10, 2016

(54) WIRELESS POWER RECEIVER CIRCUITRY

(75) Inventors: William H. Von Novak, San Diego, CA (US); Linda S. Irish, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/250,783

(22) Filed: Sep. 30, 2011

(65) Prior Publication Data

US 2012/0155136 A1 Jun. 21, 2012

Related U.S. Application Data

(60) Provisional application No. 61/423,988, filed on Dec. 16, 2010.

(51) Int. Cl.
| | |
|---|---|
| *G05F 1/00* | (2006.01) |
| *H02J 5/00* | (2016.01) |
| *H02J 7/02* | (2016.01) |
| *H02M 3/158* | (2006.01) |

(52) U.S. Cl.
CPC ............... *H02J 5/005* (2013.01); *H02J 7/025* (2013.01); *H02M 3/1582* (2013.01)

(58) Field of Classification Search
CPC ... H02M 3/156; H02M 3/1582; H02M 3/157; Y02E 60/12; H02J 5/005; H02J 7/025; G05F 1/63; G05F 1/67
USPC ......... 323/222, 223, 271, 282, 284, 285, 299, 323/300, 303; 320/137, 139, 140, 141, 142, 320/143, 145, 157, 162, 108; 307/104
See application file for complete search history.

(56) References Cited

U.S. PATENT DOCUMENTS

| | | | |
|---|---|---|---|
| 4,808,907 A * | 2/1989 | Main | 323/316 |
| 5,710,697 A | 1/1998 | Cooke et al. | |
| 5,995,386 A | 11/1999 | John et al. | |
| 6,069,805 A * | 5/2000 | Anderson, Jr. | 363/49 |
| 6,218,819 B1 * | 4/2001 | Tiwari | 323/285 |
| 6,456,050 B1 * | 9/2002 | Agiman | H02M 3/1563 323/282 |
| 7,154,250 B2 | 12/2006 | Vinciarelli | |
| 7,304,463 B2 | 12/2007 | Noma | |
| 8,368,324 B2 * | 2/2013 | Lin et al. | 315/312 |
| 2003/0209993 A1 | 11/2003 | Ito et al. | |
| 2004/0227683 A1 * | 11/2004 | Caimi et al. | 343/742 |

(Continued)

FOREIGN PATENT DOCUMENTS

| | | |
|---|---|---|
| JP | H06233525 A | 8/1994 |
| JP | 7319564 A | 12/1995 |

(Continued)

OTHER PUBLICATIONS

International Search Report and Written Opinion—PCT/US2011/064714—ISA/EPO—Aug. 7, 2012.

*Primary Examiner* — Adolf Berhane
*Assistant Examiner* — Alex Torres-Rivera
(74) *Attorney, Agent, or Firm* — Knobbe, Martens, Olson & Bear, LLP

(57) ABSTRACT

Exemplary embodiments are directed to wireless power receivers. A device may include a power converter configured to receive an input voltage. The device may further include circuitry configured to limit a pulse width modulation duty cycle of the power converter to prevent the input voltage from dropping below a threshold voltage.

25 Claims, 7 Drawing Sheets

(56) References Cited

U.S. PATENT DOCUMENTS

| | | |
|---|---|---|
| 2006/0227028 A1 | 10/2006 | Balogh et al. |
| 2007/0075694 A1 | 4/2007 | Xi et al. |
| 2007/0236203 A1* | 10/2007 | Koyama ............... H02M 7/003 323/315 |
| 2009/0067208 A1* | 3/2009 | Martin et al. ................. 363/126 |
| 2009/0196081 A1* | 8/2009 | Chen et al. ..................... 363/78 |
| 2009/0273325 A1* | 11/2009 | Nakahashi ........... H02M 3/156 323/282 |
| 2010/0079126 A1* | 4/2010 | Pigott ........................... 323/285 |
| 2010/0109443 A1* | 5/2010 | Cook et al. .................... 307/104 |
| 2010/0264746 A1 | 10/2010 | Kazama et al. |
| 2010/0277003 A1 | 11/2010 | Von Novak et al. |
| 2011/0053500 A1 | 3/2011 | Menegoli et al. |

FOREIGN PATENT DOCUMENTS

| | | |
|---|---|---|
| JP | 9037545 A | 2/1997 |
| JP | 10042552 A | 2/1998 |
| JP | 2002078228 A | 3/2002 |
| JP | 2002165442 A | 6/2002 |
| JP | 2003272887 A | 9/2003 |
| JP | 2006067759 A | 3/2006 |
| JP | 2010239781 A | 10/2010 |
| WO | WO-2010014634 A2 | 2/2010 |

\* cited by examiner

WIRELESS POWER RECEIVER CIRCUITRY

CLAIM OF PRIORITY UNDER 35 U.S.C. §119

This application claims priority under 35 U.S.C. §119(e) to:

U.S. Provisional Patent Application 61/423,988 entitled "WIRELESS POWER DARKSIDE LIMITER" filed on Dec. 16, 2010 the disclosure of which is hereby incorporated by reference in its entirety.

BACKGROUND

1. Field

The present invention relates generally to wireless power. More specifically, the present invention relates to methods and devices for limiting a pulse width modulation duty cycle of a power converter within a wireless power receiver to prevent an undesirable operation.

2. Background

Approaches are being developed that use over the air power transmission between a transmitter and the device to be charged. These generally fall into two categories. One is based on the coupling of plane wave radiation (also called far-field radiation) between a transmit antenna and receive antenna on the device to be charged which collects the radiated power and rectifies it for charging the battery. Antennas are generally of resonant length in order to improve the coupling efficiency. This approach suffers from the fact that the power coupling falls off quickly with distance between the antennas. So charging over reasonable distances (e.g., >1-2 m) becomes difficult. Additionally, since the system radiates plane waves, unintentional radiation can interfere with other systems if not properly controlled through filtering.

Other approaches are based on inductive coupling between a transmit antenna embedded, for example, in a "charging" mat or surface and a receive antenna plus a rectifying circuit embedded in the host device to be charged. This approach has the disadvantage that the spacing between transmit and receive antennas must be very close (e.g. mms). Though this approach does have the capability to simultaneously charge multiple devices in the same area, this area is typically small, hence the user must locate the devices to a specific area.

A need exists for methods, systems, and devices for enhancing power transfer between a wireless power transmitter and one or more wireless power receivers.

DETAILED DESCRIPTION

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein.

The term "wireless power" is used herein to mean any form of energy associated with electric fields, magnetic fields, electromagnetic fields, or otherwise that is transmitted between a transmitter and a receiver without the use of physical electrical conductors. Hereafter, all three of these will be referred to generically as radiated fields, with the understanding that pure magnetic or pure electric fields do not radiate power. These may be coupled to a "receiving antenna" to achieve power transfer.

Figure 1:
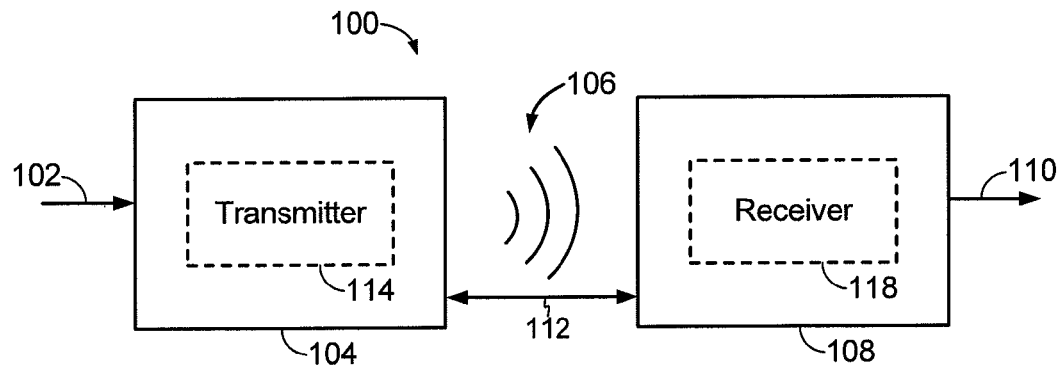
FIG. 1 shows a simplified block diagram of a wireless power transfer system.

FIG. 1 illustrates a wireless transmission or charging system 100, in accordance with various exemplary embodiments of the present invention. Input power 102 is provided to a transmitter 104 for generating a field 106 for providing energy transfer. A receiver 108 couples to the field 106 and generates an output power 110 for storing or consumption by a device (not shown) coupled to the output power 110. Both the transmitter 104 and the receiver 108 are separated by a distance 112. In one exemplary embodiment, transmitter 104 and receiver 108 are configured according to a mutual resonant relationship and when the resonant frequency of receiver 108 and the resonant frequency of transmitter 104 are very close, transmission losses between the transmitter 104 and the receiver 108 are minimal when the receiver 108 is located in the "near-field" of the field 106.

Transmitter 104 further includes a transmit antenna 114 for providing a means for energy transmission and receiver 108 further includes a receive antenna 118 for providing a means for energy reception. The transmit and receive antennas are sized according to applications and devices to be associated therewith. As stated, an efficient energy transfer occurs by coupling a large portion of the energy in the near-field of the transmitting antenna to a receiving antenna rather than propagating most of the energy in an electromagnetic wave to the far field. When in this near-field a coupling mode may be developed between the transmit antenna 114 and the receive antenna 118. The area around the antennas 114 and 118 where this near-field coupling may occur is referred to herein as a coupling-mode region.

Figure 2:
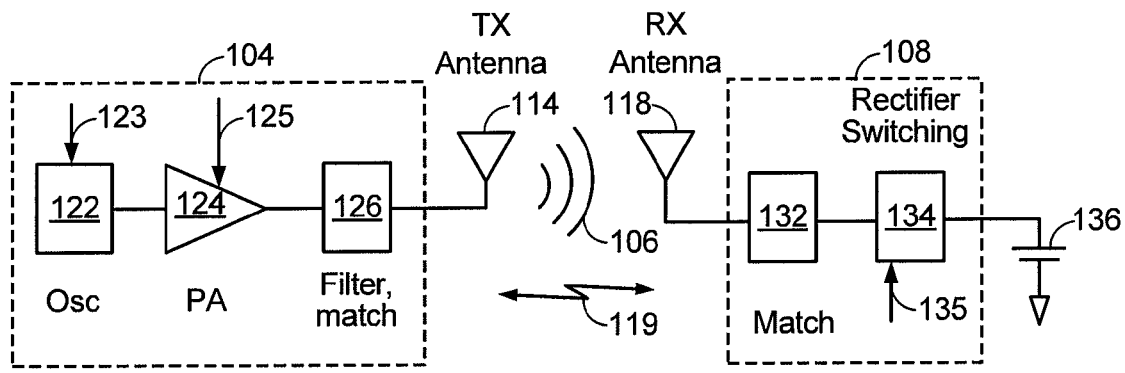
FIG. 2 shows a simplified schematic diagram of a wireless power transfer system.

FIG. 2 shows a simplified schematic diagram of a wireless power transfer system. The transmitter 104 includes an oscillator 122, a power amplifier 124 and a filter and matching circuit 126. The oscillator is configured to generate at a desired frequency, such as 468.75 KHz, 6.78 MHz or 13.56 MHz, which may be adjusted in response to adjustment signal 123. The oscillator signal may be amplified by the power amplifier 124 with an amplification amount responsive to control signal 125. The filter and matching circuit 126 may be included to filter out harmonics or other unwanted frequencies and match the impedance of the transmitter 104 to the transmit antenna 114.

The receiver 108 may include a matching circuit 132 and a rectifier and switching circuit 134 to generate a DC power output to charge a battery 136 as shown in FIG. 2 or power a device coupled to the receiver (not shown). The matching circuit 132 may be included to match the impedance of the receiver 108 to the receive antenna 118. The receiver 108 and transmitter 104 may communicate on a separate communication channel 119 (e.g., Bluetooth, zigbee, cellular, etc).

As described more fully below, receiver 108, which may initially have a selectively disablable associated load (e.g., battery 136), may be configured to determine whether an amount of power transmitted by transmitter 104 and received by receiver 108 is sufficient for charging battery 136. Further, receiver 108 may be configured to enable a load (e.g., battery 136) upon determining that the amount of power is sufficient.

Figure 3:
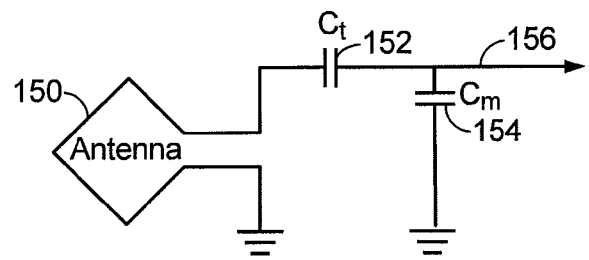
FIG. 3 illustrates a schematic diagram of a loop antenna for use in exemplary embodiments of the present invention.

As illustrated in FIG. 3, antennas used in exemplary embodiments may be configured as a "loop" antenna 150, which may also be referred to herein as a "magnetic" antenna. Loop antennas may be configured to include an air core or a physical core such as a ferrite core. Air core loop antennas may be more tolerable to extraneous physical devices placed in the vicinity of the core. Furthermore, an air core loop antenna allows the placement of other components within the core area. In addition, an air core loop may more readily enable placement of the receive antenna 118 (FIG. 2) within a plane of the transmit antenna 114 (FIG. 2) where the coupled-mode region of the transmit antenna 114 (FIG. 2) may be more powerful.

As stated, efficient transfer of energy between the transmitter 104 and receiver 108 occurs during matched or nearly matched resonance between the transmitter 104 and the receiver 108. However, even when resonance between the transmitter 104 and receiver 108 are not matched, energy may be transferred, although the efficiency may be affected. Transfer of energy occurs by coupling energy from the near-field of the transmitting antenna to the receiving antenna residing in the neighborhood where this near-field is established rather than propagating the energy from the transmitting antenna into free space.

The resonant frequency of the loop or magnetic antennas is based on the inductance and capacitance. Inductance in a loop antenna is generally simply the inductance created by the loop, whereas, capacitance is generally added to the loop antenna's inductance to create a resonant structure at a desired resonant frequency. As a non-limiting example, capacitor 152 and capacitor 154 may be added to the antenna to create a resonant circuit that generates resonant signal 156. Accordingly, for larger diameter loop antennas, the size of capacitance needed to induce resonance decreases as the diameter or inductance of the loop increases. Furthermore, as the diameter of the loop or magnetic antenna increases, the efficient energy transfer area of the near-field increases. Of course, other resonant circuits are possible. As another non-limiting example, a capacitor may be placed in parallel between the two terminals of the loop antenna. In addition, those of ordinary skill in the art will recognize that for transmit antennas the resonant signal 156 may be an input to the loop antenna 150.

Figure 4:
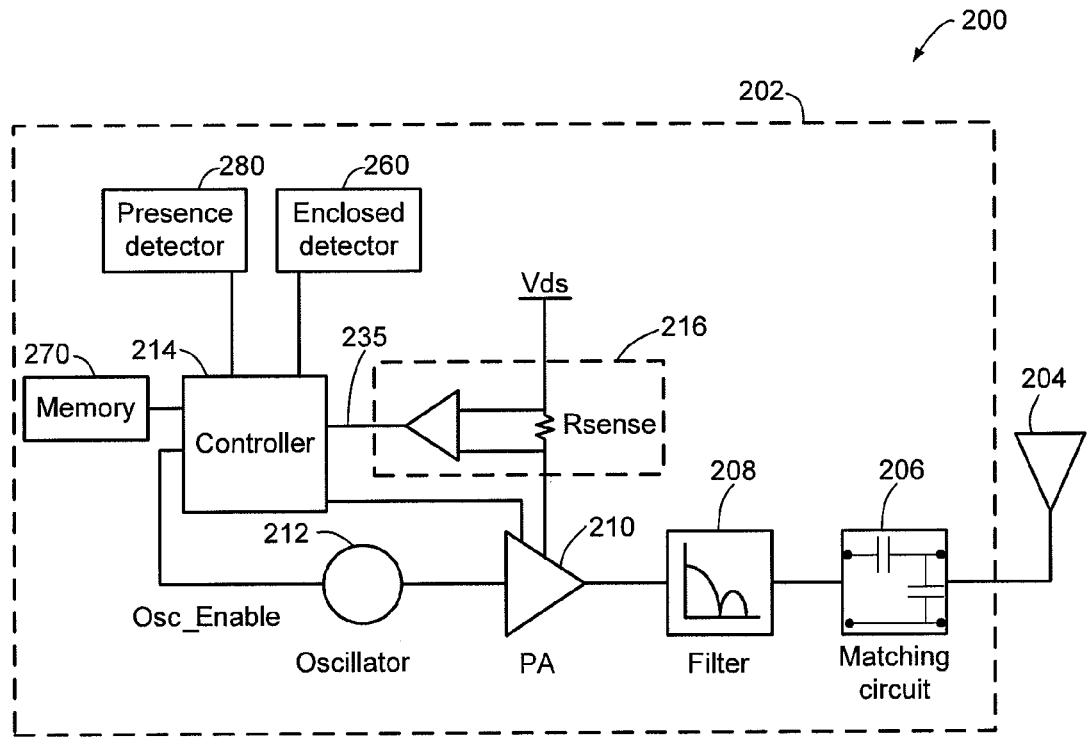
FIG. 4 is a simplified block diagram of a transmitter, in accordance with an exemplary embodiment of the present invention.

FIG. 4 is a simplified block diagram of a transmitter 200, in accordance with an exemplary embodiment of the present invention. The transmitter 200 includes transmit circuitry 202 and a transmit antenna 204. Generally, transmit circuitry 202 provides RF power to the transmit antenna 204 by providing an oscillating signal resulting in generation of near-field energy about the transmit antenna 204. It is noted that transmitter 200 may operate at any suitable frequency. By way of example, transmitter 200 may operate at the 13.56 MHz ISM band.

Exemplary transmit circuitry 202 includes a fixed impedance matching circuit 206 for matching the impedance of the transmit circuitry 202 (e.g., 50 ohms) to the transmit antenna 204 and a low pass filter (LPF) 208 configured to reduce harmonic emissions to levels to prevent self-jamming of devices coupled to receivers 108 (FIG. 1). Other exemplary embodiments may include different filter topologies, including but not limited to, notch filters that attenuate specific frequencies while passing others and may include an adaptive impedance match, that can be varied based on measurable transmit metrics, such as output power to the antenna or DC current drawn by the power amplifier. Transmit circuitry 202 further includes a power amplifier 210 configured to drive an RF signal as determined by an oscillator 212. The transmit circuitry may be comprised of discrete devices or circuits, or alternately, may be comprised of an integrated assembly. An exemplary RF power output from transmit antenna 204 may be on the order of 2.5 Watts.

Transmit circuitry 202 further includes a controller 214 for enabling the oscillator 212 during transmit phases (or duty cycles) for specific receivers, for adjusting the frequency or phase of the oscillator, and for adjusting the output power level for implementing a communication protocol for interacting with neighboring devices through their attached receivers. It is noted that the controller 214 may also be referred to herein as processor 214. As is well known in the art, adjustment of oscillator phase and related circuitry in the transmission path allows for reduction of out of band emissions, especially when transitioning from one frequency to another.

The transmit circuitry 202 may further include a load sensing circuit 216 for detecting the presence or absence of active receivers in the vicinity of the near-field generated by transmit antenna 204. By way of example, a load sensing circuit 216 monitors the current flowing to the power amplifier 210, which is affected by the presence or absence of active receivers in the vicinity of the near-field generated by transmit antenna 204. Detection of changes to the loading on the power amplifier 210 are monitored by controller 214 for use in determining whether to enable the oscillator 212 for transmitting energy and to communicate with an active receiver. As described more fully below, a current measured at power amplifier 210 may be used to determine whether an invalid device is positioned within a charging region of transmitter 200.

Transmit antenna 204 may be implemented with a Litz wire or as an antenna strip with the thickness, width and metal type selected to keep resistive losses low. In a conventional implementation, the transmit antenna 204 can generally be configured for association with a larger structure such as a table, mat, lamp or other less portable configuration. Accordingly, the transmit antenna 204 generally may not need "turns" in order to be of a practical dimension. An exemplary implementation of a transmit antenna 204 may be "electrically small" (i.e., fraction of the wavelength) and tuned to resonate at lower usable frequencies by using capacitors to define the resonant frequency.

The transmitter 200 may gather and track information about the whereabouts and status of receiver devices that may be associated with the transmitter 200. Thus, the transmitter circuitry 202 may include a presence detector 280, an enclosed detector 260, or a combination thereof, connected to the controller 214 (also referred to as a processor herein). The controller 214 may adjust an amount of power delivered by the amplifier 210 in response to presence signals from the presence detector 280 and the enclosed detector 260. The transmitter may receive power through a number of power sources, such as, for example, an AC-DC converter (not shown) to convert conventional AC power present in a building, a DC-DC converter (not shown) to convert a conventional DC power source to a voltage suitable for the transmitter 200, or directly from a conventional DC power source (not shown).

As a non-limiting example, the presence detector 280 may be a motion detector utilized to sense the initial presence of a device to be charged that is inserted into the coverage area of the transmitter. After detection, the transmitter may be turned on and the RF power received by the device may be used to toggle a switch on the Rx device in a pre-determined manner, which in turn results in changes to the driving point impedance of the transmitter.

As another non-limiting example, the presence detector 280 may be a detector capable of detecting a human, for example, by infrared detection, motion detection, or other suitable means. In some exemplary embodiments, there may be regulations limiting the amount of power that a transmit antenna may transmit at a specific frequency. In some cases, these regulations are meant to protect humans from electromagnetic radiation. However, there may be environments where transmit antennas are placed in areas not occupied by humans, or occupied infrequently by humans, such as, for example, garages, factory floors, shops, and the like. If these environments are free from humans, it may be permissible to increase the power output of the transmit antennas above the normal power restrictions regulations. In other words, the controller 214 may adjust the power output of the transmit antenna 204 to a regulatory level or lower in response to human presence and adjust the power output of the transmit antenna 204 to a level above the regulatory level when a human is outside a regulatory distance from the electromagnetic field of the transmit antenna 204.

As a non-limiting example, the enclosed detector 260 (may also be referred to herein as an enclosed compartment detector or an enclosed space detector) may be a device such as a sense switch for determining when an enclosure is in a closed or open state. When a transmitter is in an enclosure that is in an enclosed state, a power level of the transmitter may be increased.

In exemplary embodiments, a method by which the transmitter 200 does not remain on indefinitely may be used. In this case, the transmitter 200 may be programmed to shut off after a user-determined amount of time. This feature prevents the transmitter 200, notably the power amplifier 210, from running long after the wireless devices in its perimeter are fully charged. This event may be due to the failure of the circuit to detect the signal sent from either the repeater or the receive coil that a device is fully charged. To prevent the transmitter 200 from automatically shutting down if another device is placed in its perimeter, the transmitter 200 automatic shut off feature may be activated only after a set period of lack of motion detected in its perimeter. The user may be able to determine the inactivity time interval, and change it as desired. As a non-limiting example, the time interval may be longer than that needed to fully charge a specific type of wireless device under the assumption of the device being initially fully discharged.

Figure 5:
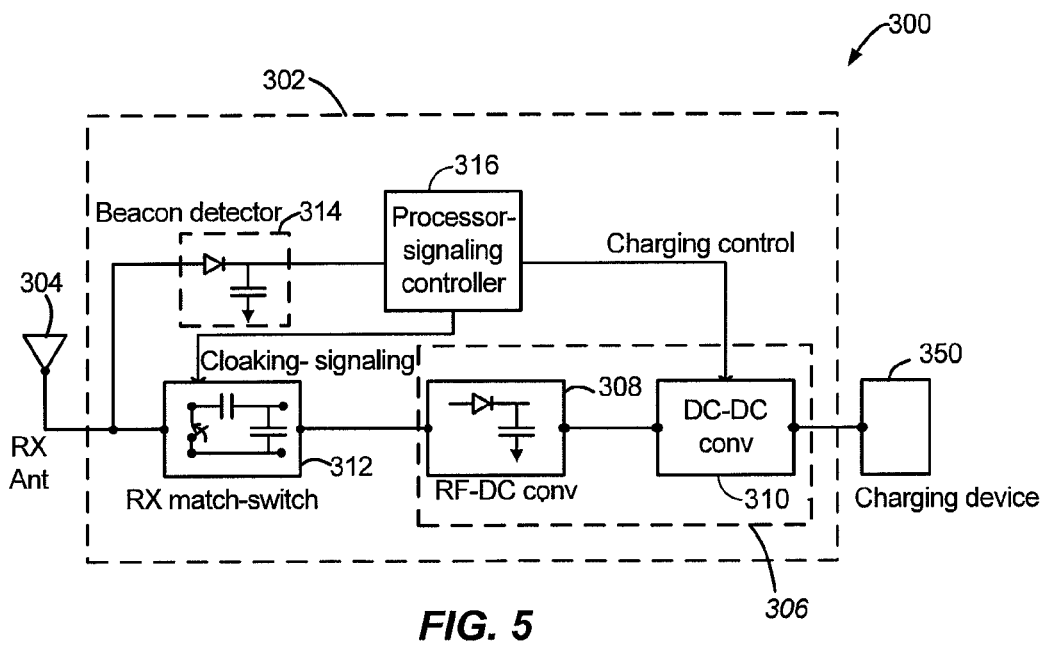
FIG. 5 is a simplified block diagram of a receiver, in accordance with an exemplary embodiment of the present invention.

FIG. 5 is a simplified block diagram of a receiver 300, in accordance with an exemplary embodiment of the present invention. The receiver 300 includes receive circuitry 302 and a receive antenna 304. Receiver 300 further couples to device 350 for providing received power thereto. It should be noted that receiver 300 is illustrated as being external to device 350 but may be integrated into device 350. Generally, energy is propagated wirelessly to receive antenna 304 and then coupled through receive circuitry 302 to device 350.

Receive antenna 304 is tuned to resonate at the same frequency, or within a specified range of frequencies, as transmit antenna 204 (FIG. 4). Receive antenna 304 may be similarly dimensioned with transmit antenna 204 or may be differently sized based upon the dimensions of the associated device 350. By way of example, device 350 may be a portable electronic device having diametric or length dimension smaller that the diameter of length of transmit antenna 204. In such an example, receive antenna 304 may be implemented as a multi-turn antenna in order to reduce the capacitance value of a tuning capacitor (not shown) and increase the receive antenna's impedance. By way of example, receive antenna 304 may be placed around the substantial circumference of device 350 in order to maximize the antenna diameter and reduce the number of loop turns (i.e., windings) of the receive antenna and the inter-winding capacitance.

Receive circuitry 302 provides an impedance match to the receive antenna 304. Receive circuitry 302 includes power conversion circuitry 306 for converting a received RF energy source into charging power for use by device 350. Power conversion circuitry 306 includes an RF-to-DC converter 308 and may also in include a DC-to-DC converter 310. RF-to-DC converter 308 rectifies the RF energy signal received at receive antenna 304 into a non-alternating power while DC-to-DC converter 310 converts the rectified RF energy signal into an energy potential (e.g., voltage) that is compatible with device 350. Various RF-to-DC converters are contemplated, including partial and full rectifiers, regulators, bridges, doublers, as well as linear and switching converters.

Receive circuitry 302 may further include switching circuitry 312 for connecting receive antenna 304 to the power conversion circuitry 306 or alternatively for disconnecting the power conversion circuitry 306. Disconnecting receive antenna 304 from power conversion circuitry 306 not only suspends charging of device 350, but also changes the "load" as "seen" by the transmitter 200 (FIG. 2).

As disclosed above, transmitter 200 includes load sensing circuit 216 which detects fluctuations in the bias current provided to transmitter power amplifier 210. Accordingly, transmitter 200 has a mechanism for determining when receivers are present in the transmitter's near-field.

When multiple receivers 300 are present in a transmitter's near-field, it may be desirable to time-multiplex the loading and unloading of one or more receivers to enable other receivers to more efficiently couple to the transmitter. A receiver may also be cloaked in order to eliminate coupling to other nearby receivers or to reduce loading on nearby transmitters. This "unloading" of a receiver is also known herein as a "cloaking." Furthermore, this switching between unloading and loading controlled by receiver 300 and detected by transmitter 200 provides a communication mechanism from receiver 300 to transmitter 200 as is explained more fully below. Additionally, a protocol can be associated with the switching which enables the sending of a message from receiver 300 to transmitter 200. By way of example, a switching speed may be on the order of 100 μsec.

In an exemplary embodiment, communication between the transmitter and the receiver refers to a device sensing and charging control mechanism, rather than conventional two-way communication. In other words, the transmitter may use on/off keying of the transmitted signal to adjust whether energy is available in the near-field. The receivers interpret these changes in energy as a message from the transmitter. From the receiver side, the receiver may use tuning and de-tuning of the receive antenna to adjust how much power is being accepted from the near-field. The transmitter can detect this difference in power used from the near-field and interpret these changes as a message from the receiver. It is noted that other forms of modulation of the transmit power and the load behavior may be utilized.

Receive circuitry 302 may further include signaling detector and beacon circuitry 314 used to identify received energy fluctuations, which may correspond to informational signaling from the transmitter to the receiver. Furthermore, signaling and beacon circuitry 314 may also be used to detect the transmission of a reduced RF energy (i.e., a beacon signal) and to rectify the reduced RF signal energy into a nominal power for awakening either un-powered or power-depleted circuits within receive circuitry 302 in order to configure receive circuitry 302 for wireless charging.

Receive circuitry 302 further includes processor 316 for coordinating the processes of receiver 300 described herein including the control of switching circuitry 312 described herein. Cloaking of receiver 300 may also occur upon the occurrence of other events including detection of an external wired charging source (e.g., wall/USB power) providing charging power to device 350. Processor 316, in addition to controlling the cloaking of the receiver, may also monitor beacon circuitry 314 to determine a beacon state and extract messages sent from the transmitter. Processor 316 may also adjust DC-to-DC converter 310 for improved performance.

In RF power transfer systems, there may be a stability issue when transferring power from a wireless power transmitter to one or more wireless power receivers. Most power transfer systems attempt to maintain a given output voltage at a receiver despite changing demands from the device being charged. This may be accomplished by a switching regulator, which can increase or decrease the power transferred based on an output voltage, thus keeping the output voltage within limits.

The characteristics of DC-to-DC converters results in a negative DC-to-DC impedance. In other words, when voltage increases, the DC-to-DC converter may decrease current to maintain output voltage. Additionally, many wireless power systems have a characteristic source impedance driving the input of the DC-to-DC converter. This impedance can be influenced by factors such as number of devices on the charging pad, distance from the charging pad to the receiver and size of the receiver coil.

The maximum or near maximum power may be transferred when a negative impedance of the DC-to-DC converter equals the positive impedance of the source. If a load increases, or the source impedance increases due to a change in charger configuration (e.g., the receiver being moved away from a transmitter pad), the receiver can see a rapid voltage collapse. During such an event, the DC-to-DC converter may rapidly reduce its input impedance to attempt to maintain the output voltage, but the continued reduction in input impedance may eventually result in a reduced level of power transfer. Stated another way, if the input impedance is reduced past a critical point, an undesirable, quasi-stable state may occur. This state may be referred to herein after as "darkside operation." In darkside operation, the input voltage to the DC-to-DC converter drops significantly, power transfer is greatly reduced, and all receivers may experience degradation in power transfer performance.

Figure 6:
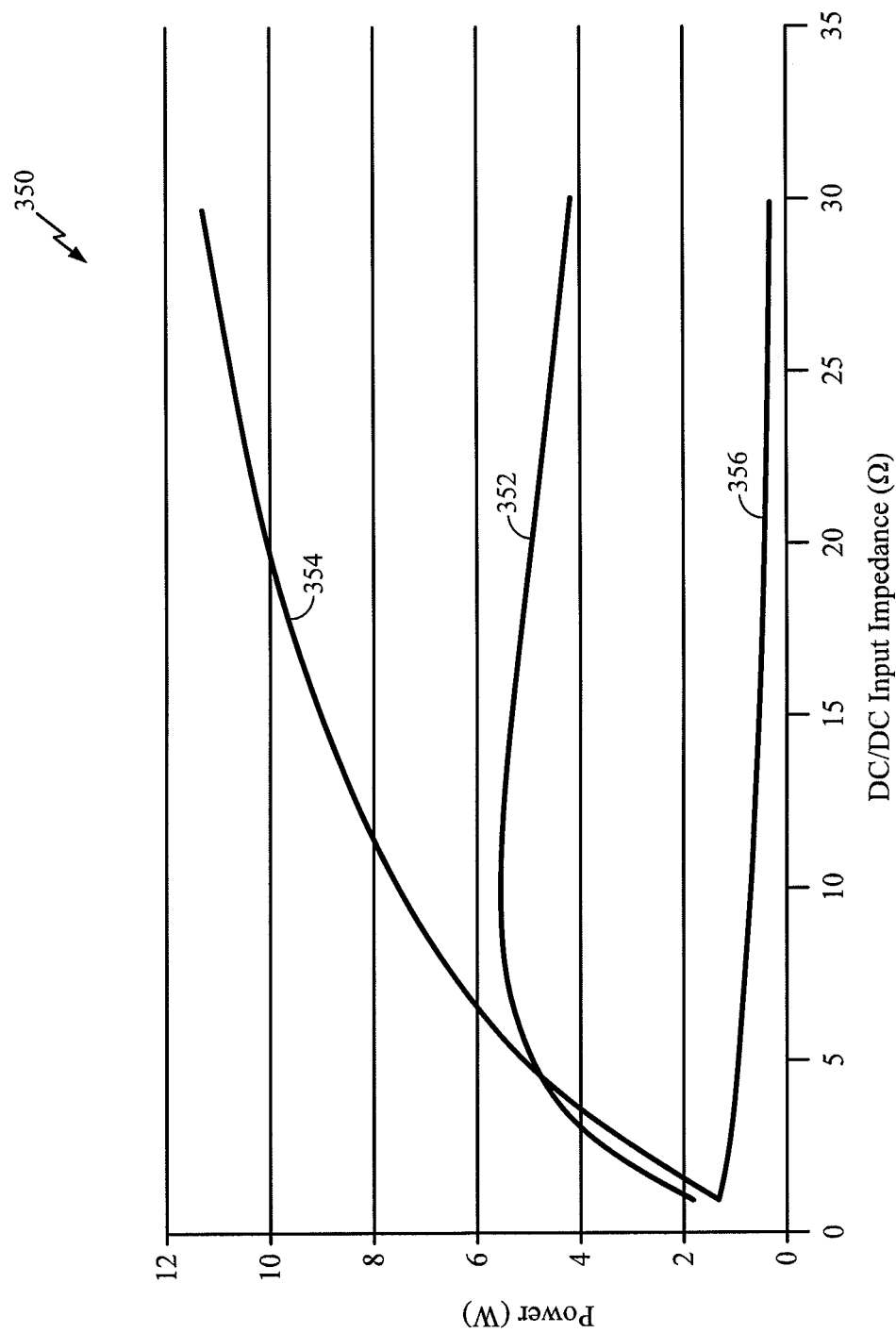
FIG. 6 is a plot illustrating a behavior of a system including a DC-to-DC converter.

With reference to FIG. 6, darkside operation will be further described. FIG. 6 is a plot 350 illustrating a behavior of a system with a 15 volt, 10 ohm Thevenin-equivalent source driving a DC-to-DC converter. Signal 352 represent an output power of the DC-to-DC converter, signal 354 represents a voltage at an associated load, and signal 356 represents a current that the load is drawing. As the DC-to-DC converter senses an increase in load, it may reduce its input impedance, which is the horizontal axis in FIG. 6. In a case wherein the load is 30 ohms, the output power 352 is approximately 4.2 watts and the system is stable. If the load increases slightly, the DC-to-DC converter may reduce its input impedance and, thus, output power 350 may increase. However, if the load continues to increase, there comes a point (e.g., where input impedance equals 10 ohms) where any further decrease in input impedance results in a reduction of output power. At this point the system is unstable and any further increase in load results in a decrease in power. This may continue until the system collapses to a low voltage, low power state (represented by the left side of the graph).

A system may be designed where no device can ever draw enough power to get near a darkside operation. This may limit the maximum power that each device receives, and requires high power transmission even during times of low power usage. This has proven to be inefficient. A second method involves the use of active circuitry to sense load and increase power from the transmitter when a darkside operation seems imminent. Since a load can change drastically and quite rapidly, this requires a very rapid method of detecting load change and altering power output. This can be difficult at a system level. A third method involves tightly constraining the number of devices and the coupling model, so that the source impedance may always be low enough to avoid darkside operation. This may limit applications of a wireless product. For example, it may require all receivers to be a certain size, and the number of devices that can operate on a given charger pad may be limited.

Various exemplary embodiments of the invention, as described herein, relate to devices and methods for limiting, and possibly preventing, darkside operation. For example, exemplary embodiments may comprise active circuitry on the receiver side to minimize or prevent darkside operation. It is noted that the exemplary embodiments described below may be implemented alone or with one of the systems described above to accomplish efficient power transfer. For example, an exemplary embodiment of the present invention may be combined with load sense circuitry to improve reliability.

It is noted that according various exemplary embodiments described herein, a receiver may be configured to detect possible darkside operation by monitoring the input voltage of a power converter (e.g., a DC-to-DC converter). Further, if the input voltage drops below a threshold voltage, operation of the power converter may be modified. Modifying the operation of the power converter may reduce power to an associated load but darkside operation may be avoided. More specifically, according to various exemplary embodiments, an amount of power that is allowed to be drawn from an output of a power converter (e.g., a DC-to-DC power converter) is limited once an input voltage to the power converter drops below a certain point. This may increase the input resistance of the power converter and minimize or prevent darkside operation.

Furthermore, various exemplary embodiments may include limiting a pulse width modulation duty cycle of a converter (e.g., a DC-to-DC converter), which may, in turn, limit the maximum power output from the converter. In the case of a buck mode DC-to-DC converter, the overall transfer equation, neglecting losses, is Vout=Vin*PWM, wherein Vout and Vin are voltages at the output and input, respectively, and PWM is a pulse width from 0 to 100%. Thus, by limiting the maximum pulse width to 50%, the minimum input voltage may be held to twice the regulated output voltage. For example, in a case of a 5 volt output, the input voltage could not drop below 10 volts. Assuming a 5 watt output (max 5 volts 1 amp) this limits the minimum DC-to-DC input impedance to 20 ohms.

It is noted that many DC power specifications may allow a reduction in output power under certain conditions, or allow a voltage drop that may indirectly result in reduced power demand. For example, the USB 2.0 power specification allows voltage to drop to as low as 4.35 volts while remaining within specifications. A system that drops its output voltage to 4.35 volts may see an overall decrease in power.

Figure 7:
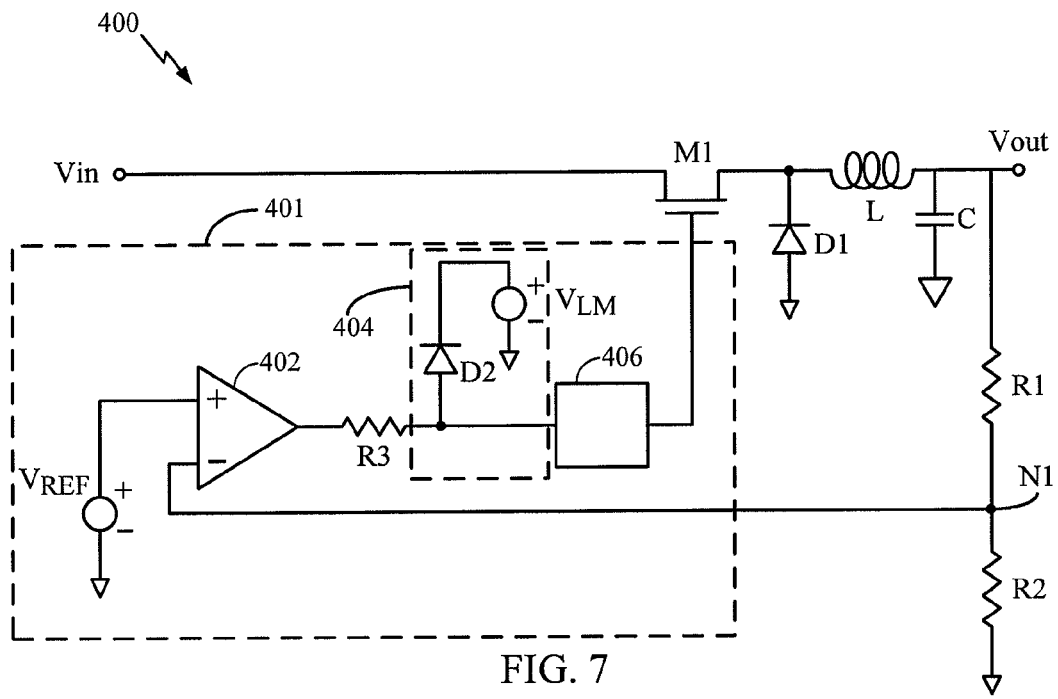
FIG. 7 illustrates a receiver circuit, according to an exemplary embodiment of the present invention.

FIG. 7 is a circuit diagram of a receiver circuit 400, according to an exemplary embodiment of the present invention. As illustrated in FIG. 7, receiver circuit 400 is configured to receive an input voltage Vin and an output a voltage Vout. Receiver circuit 400 includes a transistor M1, a diode D1, an inductor L, capacitor C, and resistors R1 and R2. Further, receiver circuit 400 includes a DC-to-DC converter 401 including an error amplifier 402, a duty cycle limiter 404, and a pulse width modulation (PWM) generator 406. By way of example only duty cycle limiter 404 may include a diode D2 coupled to a voltage source $V_{LM}$. It is noted that voltage source $V_{LM}$ may be either a fixed reference voltage or a configurable reference voltage. Moreover, a first input of error amplifier 402 is coupled to a reference voltage $V_{REF}$ and a second input is coupled to a voltage at a node N1, which is between resistor R1 and resistor R2. An output of error amplifier 402 is coupled to each of duty cycle limiter 404 and PWM generator 406 via a resistor R3. Furthermore, an output of PWM generator 406 is coupled to a gate of transistor M1.

As will be appreciated by a person having ordinary skill, if an error signal generated by error amplifier 402 is positive, PWM generator 406 may generate an output signal to enable an amount of time in which transistor M1 is conducting to increase. Thus, output voltage Vout may increase. However, during a contemplated operation of receiver circuit 400, duty cycle limiter 404 may be configured to limit the duty cycle of PWM generator 406 and, thus, may prevent input voltage Vin from decreasing below a certain voltage. Stated another way, diode D2 and voltage source $V_{LM}$ may be configured to limit the PWM duty cycle that can be generated by the PWM generator 406 and, as a result, the maximum output of error amplifier 402 may not rise above a threshold voltage. This may prevent the pulsewidth of M1, and thus the output of the DC/DC converter, from increasing. This, in turn, may limit the maximum power to the load, and maintain or increase the input impedance, thus preventing Vin from decreasing below a certain voltage.

By way of example only, duty cycle limiter 404 may be configured to limit the duty cycle of PWM generator 406 to 50% and, therefore, if, in this example, output voltage Vout is equal to 5 volts, input voltage Vin may not drop below 10 volts. It is noted that for implementation of the exemplary embodiment illustrated in FIG. 7, it may required that duty cycle limiter 404 be integrated into an associated integrated circuit of DC-to-DC converter 401.

Figure 8:
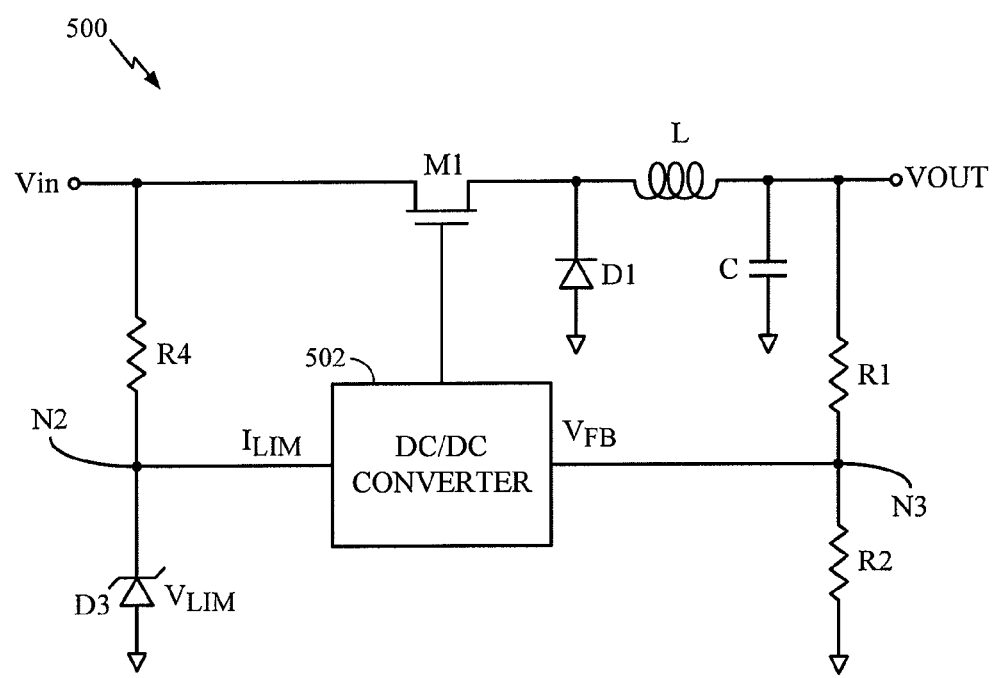
FIG. 8 depicts another receiver circuit, in accordance with an exemplary embodiment of the present invention.

FIG. 8 is a circuit diagram of another receiver circuit 500, in accordance with another exemplary embodiment of the present invention. Receiver circuit 500 is configured to receive input voltage Vin and output a voltage VOUT. Similarly to receiver circuit 400, receiver circuit 500 includes transistor M1, diode D1, inductor L, capacitor C and resistors R1 and R2. Receiver circuit 500 further includes a resistor R4, a zener diode D3, and a DC-to-DC converter 502. DC-to-DC converter 502 has a first input that is coupled to a node N2, which is positioned between resistor R4 and zener diode D3. The first input of DC-to-DC converter 502 is configured to receive a voltage $I_{LIM}$, which sets the maximum output current of the DC/DC converter. Furthermore, DC-to-DC converter 502 has a second input that is configured to receive a feedback voltage $V_{FB}$ at a node N3, which is positioned between resistor R1 and resistor R2. An output of DC-to-DC converter 502 is coupled to a gate of transistor M1.

If input voltage Vin remains above a conducting voltage ($V_{LIM}$) of zener diode D3, an output current of receiver circuit 500 may reach an acceptable maximum. Further, as will be appreciated by a person having ordinary skill in the art, as input voltage Vin decreases below voltage $V_{LIM}$, zener diode D3 may stop conducting and the voltage at $I_{LIM}$, and consequently the output current, may decrease. Accordingly, as the voltage at $I_{LIM}$ decreases, the PWM duty cycle of DC-to-DC converter 502 is decreased. It is noted that converter 500 may provide an adequate solution for a darkside operation when a substantially stable output voltage (i.e., voltage VOUT) is desired.

Figure 9:
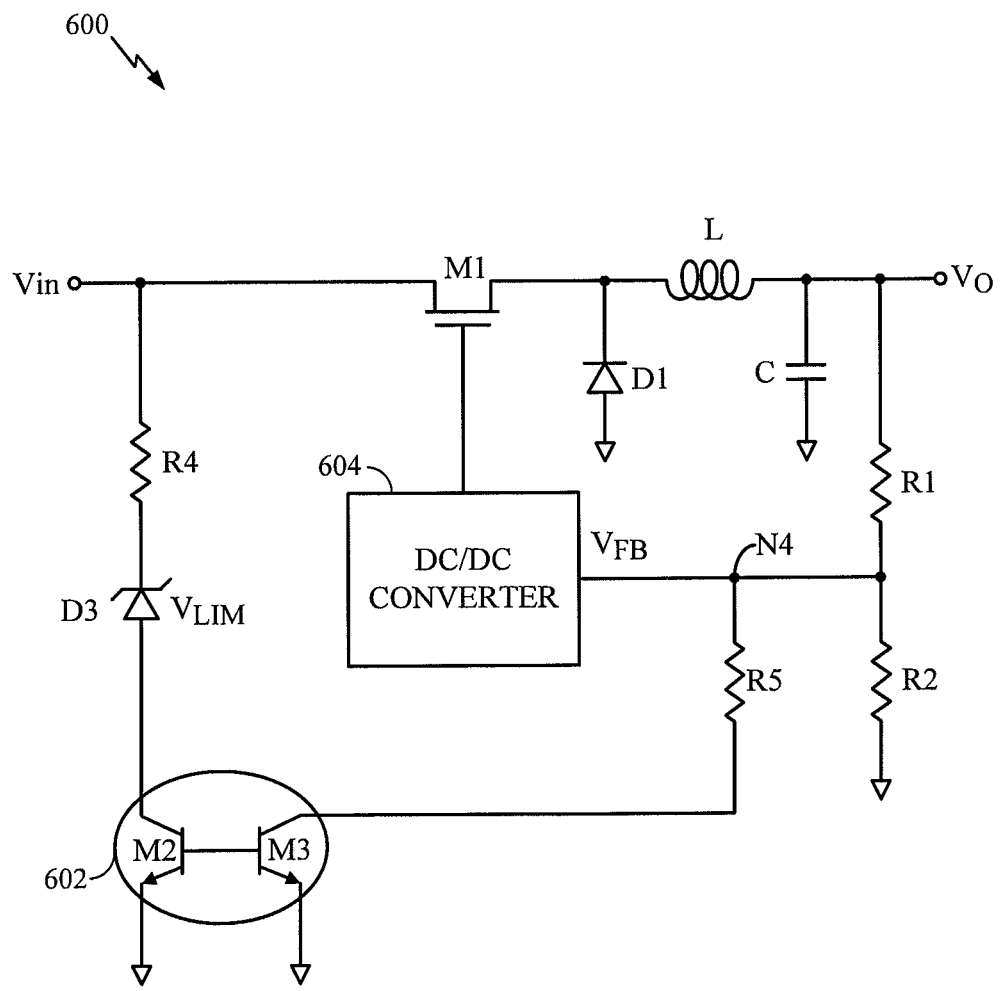
FIG. 9 illustrates yet another receiver circuit, according to another exemplary embodiment of the present invention.

FIG. 9 is a circuit diagram of another receiver circuit 600, according to an exemplary embodiment of the present invention. Receiver circuit 600 is configured to receive input voltage Vin and output a voltage Vo. Similarly to receiver circuit 500, receiver circuit 600 includes transistor M1, diode D1, zener diode D3, inductor L, capacitor C1, and resistors R1, R2, and R4. Moreover, receiver circuit 600 includes a current mirror 602 having a first transistor M2 coupled to zener diode D3 and a second transistor M3 coupled to a resistor R5. Further, receiver circuit 600 includes a DC-to-DC converter 604 having an input configured to receive a feedback voltage $V_{FB}$ at a node N4, and an output coupled to a gate of transistor M1.

As will be appreciated by a person having ordinary skill in the art, as input voltage Vin increases to a certain voltage (i.e., the zener voltage $V_{LIM}$), zener diode D3 may start to conduct, a current through transistor M2 may be equal to a current through transistor M3, and an acceptable output voltage Vo is attained. Further, when input voltage Vin begins to drop below the zener voltage $V_{LIM}$, the pulldown resistor (i.e., resistor R5) is gradually removed from the circuit and, as a result, the voltage at the feedback pin rises, and consequently output voltage Vo decreases. This tends to decrease power, which accomplishes the goal of limiting the PWM duty cycle of DC-to-DC controller 604. It is noted that the embodiment illustrated in FIG. 9 may be compatible with most, if not all, DC-to-DC converters, since most, if not all, DC-to-DC converters have a voltage feedback pin. Moreover, the circuitry illustrated in FIG. 9 is very controllable (e.g., gain and voltage limits can be set) which may be important in certain applications.

Figure 10:
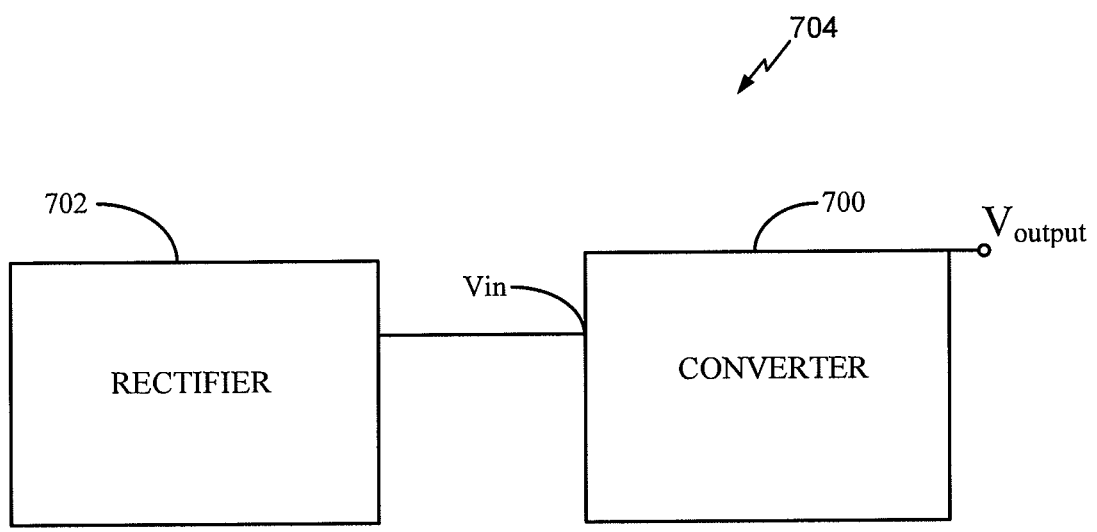
FIG. 10 is a block diagram of a portion of a receiver, in accordance with an exemplary embodiment of the present invention.

FIG. 10 is a block diagram of a portion of a receiver 704, according to an exemplary embodiment of the present invention. Receiver 704 includes a regulator 702 coupled to a receiver circuit 700, which may comprise either receiver circuit 400, receiver circuit 500, or receiver circuit 600 described above. Receiver circuit 700 is configured to receive input voltage Vin and convey an output voltage Voutput. According to various exemplary embodiments of the present invention, receiver circuit 700 may be configured to limit a pulse width modulation duty cycle thereof to prevent input voltage Vin from dropping below a threshold voltage.

Figure 11:
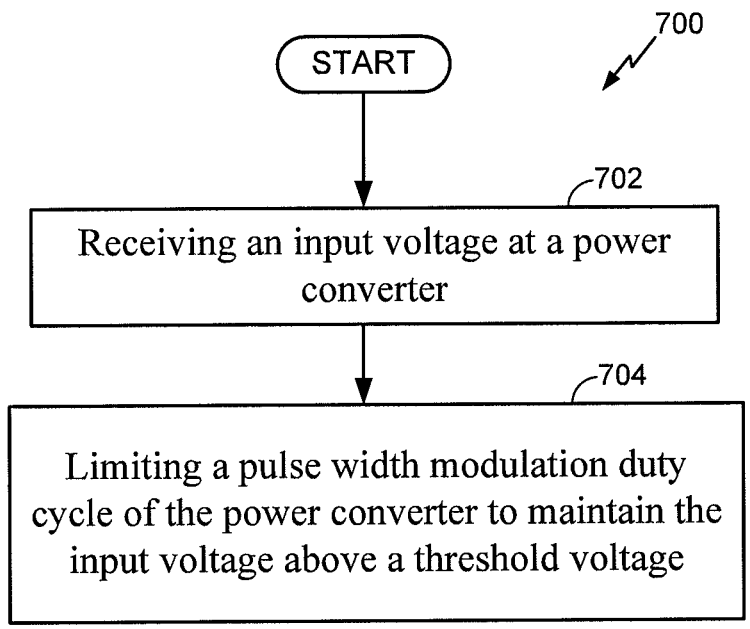
FIG. 11 is a flowchart illustrating a method, in accordance with an exemplary embodiment of the present invention.

FIG. 11 is a flowchart illustrating a method 700, in accordance with one or more exemplary embodiments. Method 700 may include receiving an input voltage at a power converter (depicted by numeral 702). Further, method 700 may include limiting a pulse width modulation duty cycle of the power converter to maintain the input voltage above a threshold voltage (depicted by numeral 704).

Figure 12:
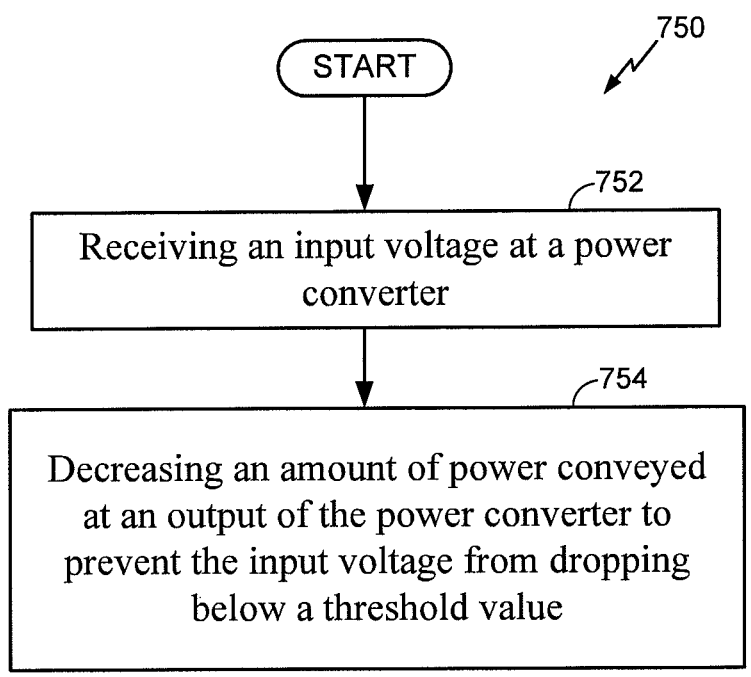
FIG. 12 is a flowchart illustrating another method, in accordance with an exemplary embodiment of the present invention.

FIG. 12 is a flowchart illustrating another method 750, in accordance with one or more exemplary embodiments. Method 750 may include receiving an input voltage at a power converter (depicted by numeral 752). Further, method 750 may include decreasing an amount of power conveyed at an output of the power converter to prevent the input voltage from dropping below a threshold value (depicted by numeral 754).

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the exemplary embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the exemplary embodiments shown herein but is to be accorded the widest scope consistent with the principles and novel features disclosed herein.

What is claimed is:

1. A device for receiving wireless charging power from a source comprising:
    a receive antenna configured to wirelessly receive charging power from the source;
    a power converter coupled to the receive antenna and configured to receive an input voltage derived from the charging power and provide at least a portion of the charging power to a load, the power converter further configured to, in response to detecting an increase in the load, reduce an input impedance of the power converter to maintain an output voltage above an output threshold voltage level; and
    circuitry operationally coupled to the power converter, the circuitry comprising a first transistor coupled to each of an end of a first diode and a ground voltage and a second transistor coupled to each of a feedback voltage that is fed into the power converter via a first resistor and the ground voltage, the circuitry configured to prevent a pulse width modulation duty cycle from increasing above a fixed maximum pulse width modulation duty cycle that prevents the input impedance from dropping below a minimum impedance value.

2. The device of claim 1, the circuitry further configured to limit an amount of power of the output voltage to prevent the input voltage from dropping below the input threshold voltage level.

3. The device of claim 1, the circuitry further comprising:
a second resistor coupled between an input for receiving the input voltage and the first diode, wherein the first diode comprises a zener diode.

4. The device of claim 3, the power converter configured to receive a variable current at the input thereof dependent on the input voltage.

5. The device of claim 1,
the first diode having a first end coupled to an input for receiving the input voltage.

6. The device of claim 5, wherein a current through the first diode and a current through the first resistor is dependent on the input voltage, and wherein the first and second transistors form a current mirror.

7. The device of claim 1, the power converter comprising the circuitry.

8. The device of claim 7, the circuitry comprising:
a second diode having a first end coupled to an output of an error amplifier and an input of a pulse width modulation generator; and
a reference voltage coupled between a second end of the second diode and a ground voltage.

9. The device of claim 1, the power converter comprising a DC-to-DC converter.

10. The device of claim 1, the circuitry further comprising a second resistor coupled to an input for receiving the input voltage and the first diode.

11. The device of claim 1, wherein the first resistor is coupled between the second transistor and the feedback voltage that is fed into the power converter, and wherein the first diode is further coupled to an input for receiving the input voltage.

12. The device of claim 11, a current through the first transistor and a current through the second transistor being dependent on the input voltage.

13. The device of claim 1, the circuitry integrated within the power converter and comprising:
a second diode coupled between an output of an error amplifier and an input of a pulse width modulation generator; and
a reference voltage coupled between the second diode and a ground voltage.

14. The device of claim 1, wherein the power converter is configured with a negative impedance that maximizes receiving the charging power.

15. The device of claim 1, wherein the power converter is configured with a negative impedance that substantially equals a positive impedance of the source.

16. The device of claim 1, wherein the receive antenna is further configured to charge a plurality of receiver devices.

17. The device of claim 1, wherein the input impedance is based at least in part on a number of a plurality of receiver devices, a distance of the receive antenna from the source, and/or size of the receive antenna.

18. The device of claim 1, wherein the feedback voltage is based on the output voltage.

19. A method for receiving wireless charging power from a source comprising:
wirelessly receiving charging power at a receive antenna from the source;
receiving an input voltage derived from the charging power at a power converter coupled to the receive antenna;
providing at least a portion of the charging power to a load;
in response to detecting an increase in the load, reducing an input impedance of the power converter;
maintaining an output voltage above an output threshold voltage level in response to reducing the input impedance; and
preventing, by a circuitry operationally coupled to the power converter, a pulse width modulation duty cycle from increasing above a fixed maximum pulse width modulation duty cycle that prevents the input impedance from dropping below a minimum impedance value, the circuitry comprising a first transistor coupled to each of an end of a diode and a ground voltage and a second transistor coupled to each of a feedback voltage that is fed into the power converter via a resistor and the ground voltage.

20. The method of claim 19, the receiving the input voltage comprising receiving the input voltage from a rectifier.

21. The method of claim 19, the preventing the pulse width modulation duty cycle comprising limiting a current conveyed to the power converter.

22. The method of claim 19, the preventing the pulse width modulation duty cycle comprising increasing a voltage at the feedback voltage that is fed into the power converter.

23. The method of claim 19, the preventing the pulse width modulation duty cycle comprising limiting a voltage conveyed to a pulse width modulation generator.

24. The method of claim 19, the receiving the input voltage comprising receiving the input voltage conveyed from a rectifier at a DC-to-DC converter.

25. A device for receiving wireless charging power from a source comprising:
means for wirelessly receiving charging power from the source;
means for receiving an input voltage derived from the charging power, the means for receiving the input voltage coupled to the means for wirelessly receiving charging power;
means for providing at least a portion of the charging power to a load;
means for reducing an input impedance of the receiving means in response to detecting an increase in the load;
means for maintaining an output voltage above an output threshold voltage level in response to reducing the input impedance; and
means for preventing a pulse width modulation duty cycle from increasing above a fixed maximum pulse width modulation duty cycle that prevents the input impedance from dropping below a minimum impedance value, the preventing means comprising a first transistor coupled to each of an end of a diode and a ground voltage and a second transistor coupled to each of a feedback voltage that is fed into the reducing means via a resistor and the ground voltage.

* * * * *